(12) United States Patent
Imamura

(10) Patent No.: US 9,090,188 B2
(45) Date of Patent: Jul. 28, 2015

(54) VEHICULAR SEATS

(71) Applicant: TOYOTA BOSHOKU KABUSHIKI KAISHA, Aichi-ken (JP)

(72) Inventor: Atsushi Imamura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 13/937,485

(22) Filed: Jul. 9, 2013

(65) Prior Publication Data

US 2014/0028074 A1   Jan. 30, 2014

(30) Foreign Application Priority Data

Jul. 24, 2012   (JP) .................................. 2012-163334

(51) Int. Cl.

| | |
|---|---|
| *B60N 2/64* | (2006.01) |
| *A47C 7/02* | (2006.01) |
| *A47C 7/18* | (2006.01) |
| *B60N 2/68* | (2006.01) |
| *B60N 2/44* | (2006.01) |

(52) U.S. Cl.
CPC . *B60N 2/64* (2013.01); *A47C 7/021* (2013.01); *A47C 7/18* (2013.01); *B60N 2/449* (2013.01); *B60N 2/643* (2013.01); *B60N 2/646* (2013.01); *B60N 2/68* (2013.01)

(58) Field of Classification Search
CPC ........ B60N 2/634; B60N 2/646; A47C 7/021; A47C 7/18
USPC ................. 297/440.1, 440.11, 440.2, 440.22, 297/452.13, 452.32, 452.56, 452.59
See application file for complete search history.

(56) References Cited

U.S. PATENT DOCUMENTS

| | | | | |
|---|---|---|---|---|
| 5,013,089 A | * | 5/1991 | Abu-Isa et al. ........... | 297/452.64 |
| 6,152,534 A | * | 11/2000 | Maeda et al. ............. | 297/452.56 |
| 6,375,269 B1 | * | 4/2002 | Maeda et al. ............. | 297/452.56 |
| 6,758,528 B2 | * | 7/2004 | Kawashima ............. | 297/452.56 |
| 6,899,398 B2 | * | 5/2005 | Coffield ................... | 297/452.56 |
| 8,727,445 B2 | * | 5/2014 | De Maina ................ | 297/452.56 |
| 2001/0040404 A1 | * | 11/2001 | Kawashima ............. | 297/452.56 |
| 2010/0201178 A1 | * | 8/2010 | Mizobata ................. | 297/452.35 |
| 2011/0254342 A1 | * | 10/2011 | De Maina ................ | 297/452.18 |
| 2013/0057035 A1 | * | 3/2013 | Nishiura et al. ........... | 297/218.3 |

FOREIGN PATENT DOCUMENTS

| | | | |
|---|---|---|---|
| JP | 11075986 | * | 3/1999 |
| JP | 11-266959 | | 10/1999 |

OTHER PUBLICATIONS

Translation of JP H11-75986, Jul. 17, 2014.*

* cited by examiner

*Primary Examiner* — Ryan Kwiecinski
(74) *Attorney, Agent, or Firm* — Greenblum & Bernstein, P.L.C.

(57) ABSTRACT

Embodiments of the present invention may include a vehicle seat having a back frame, a frame member, a sheet member, a cushion pad and a regulation structure. The back frame has a generally rectangular shape. The frame member has a shape corresponding to a part of the back frame. The sheet member is attached to the frame member in a tensioned state. The cushion pad is mounted on a front surface of the frame member. The regulation structure is provided on the frame member and the cushion pad. The regulation structure is configured to prevent the cushion pad from shifting along the front surface of the frame member.

16 Claims, 13 Drawing Sheets

VEHICULAR SEATS

This application claims priority to Japanese patent application serial number 2012-163334, the contents of which are incorporated herein by reference.

BACKGROUND OF THE INVENTION

1. Field of the Invention

Embodiments of the present invention relate to vehicle seats, and more specifically, to vehicle seats with a seat back that includes a back frame, a cloth frame body and a pair of pads.

2. Description of the Related Art

A seat called a net seat has been proposed in the related art. The net seat includes a back frame, a cloth frame body and a pair of cushion pads. The back frame is formed in a generally rectangular shape. The cloth frame body includes a frame member and a sheet member. The frame member includes left and right frames and upper and lower frames capable of being assembled to correspond to the generally rectangular shape of the back frame. The sheet member is provided on the inner side of the frame member in a tensioned state. The cushion pads are respectively assembled on respective front faces of the left and right frames of the frame member.

Japanese Laid-Open Patent Publication No. 11-266959 discloses a vehicle seat having left and right coverings sewn on each sides of the sheet member. Each of the coverings covers respective cushion pads on respective front faces of the left and right frames. When a large force such as the weight of a person sitting on the seat is applied on the pair of cushion pads, the cushion pads may be moved with respect to the other members of the seat.

Therefore, there is a need in the art for a vehicle seat of a net type capable of suppressing shifting of a cushion pad should a large force be applied to the cushion pad.

SUMMARY OF THE INVENTION

Certain embodiments of the present invention include a vehicle seat having a back frame, a frame member, a sheet member, a cushion pad and a regulation structure. The back frame has a generally rectangular shape. The frame member has a shape corresponding to a part of the back frame. The sheet member is preferably attached to the frame member in a tensioned state. The cushion pad is preferably mounted on a front surface of the frame member. The regulation structure is preferably provided on the frame member and the cushion pad. The regulation structure is preferably configured to prevent the cushion pad from shifting along the front surface of the frame member.

Therefore, even if a large force such as the weight of a person sitting in the seat is applied on the cushion pad, the regulation structure may prevent the cushion pad from shifting or moving. Thus, it is possible to prevent position deviation of the cushion pad.

According to another aspect of the invention, the regulation structure may include a rib formed on a front face of the left or right frame, and a slit formed in the cushion pad into which the rib is inserted. The rib may include a bending portion that is bent in a two-dimensional or three-dimensional manner. Compared to a rib that does not have a bending portion and which extends linearly, this rib is only slightly detached from the slit. Thus, the regulation structure is able to securely prevent the cushion pad from shifting or moving. Thus, even if a large force is applied to the cushion pad, it is possible to securely prevent position deviation of the cushion pad.

BRIEF DESCRIPTION OF THE DRAWINGS

FIG. 3b is an enlarged view of a part indicated by arrow IIIb in FIG. 3a;

FIG. 7b is an enlarged view of a part indicated by arrow VIIb in FIG. 7a;

FIG. 9b is an enlarged view of a part indicated by arrow IXb in FIG. 9a;

FIG. 10b is an enlarged view of a part indicated by arrow Xb in FIG. 10a;

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

An embodiment of the invention will be described with reference to FIGS. 1 to 5. A vehicle seat 1 is a driver's seat, a passenger's seat or the like of a net type, for example, and includes a seat cushion 2 and a seat back 3. The seat cushion 2 may comprise a known structure.

Figure 1:
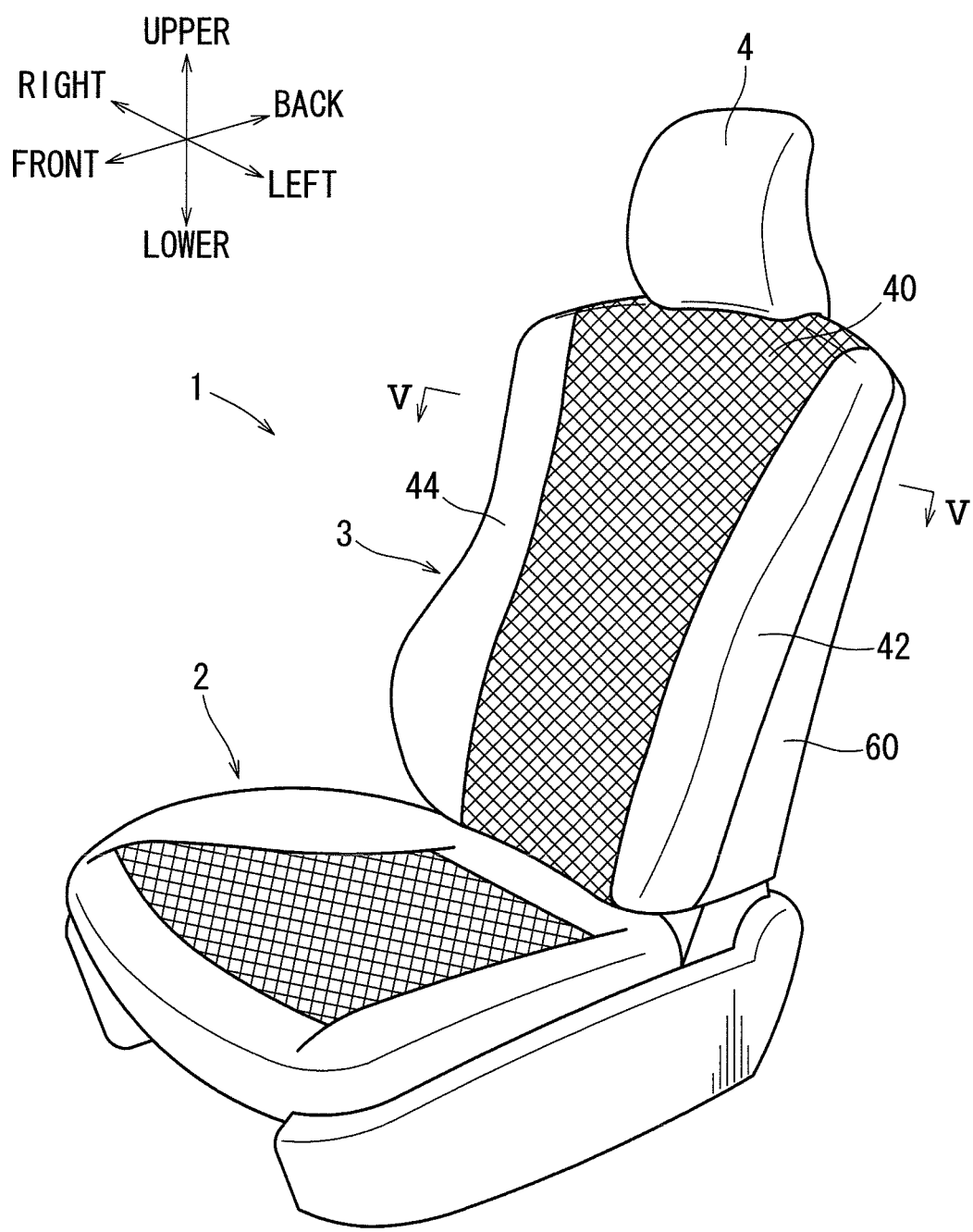
FIG. 1 is a perspective view of a vehicle seat of one aspect of the present invention.
Figure 2:
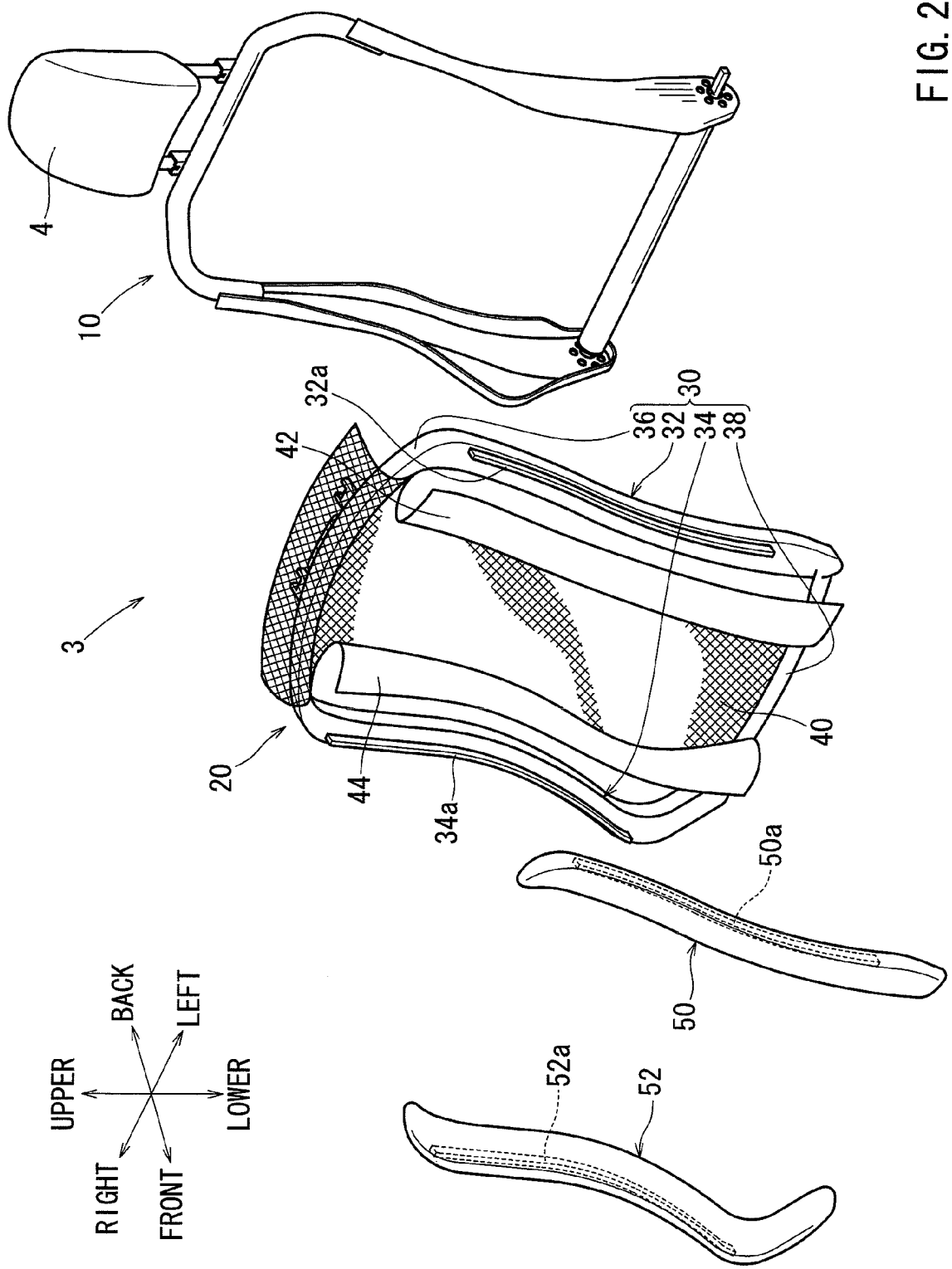
FIG. 2 is an expanded perspective view of a vehicle seat for showing a back frame, a cloth frame and a cushion pad.

As shown in FIG. 2, the seat back 3 includes a back frame 10, a cloth frame body 20, cushion pads 50 and 52, and a backboard 60 (shown in FIG. 1).

The back frame 10 forms a framework of the seat back 3 as shown in FIG. 2, and has a generally rectangular shape. A headrest 4 is detachably installed to the back frame 10. Left and right lower parts of the back frame 10 are installed on left and right rear parts of a cushion frame of the seat cushion 2 near a recliner (not shown).

As shown in FIG. 2, the cloth frame body 20 has a resin frame member 30 and a net member 40. The resin frame member 30 has a generally rectangular shape, and is made of resin. The resin frame member 30 includes a left frame (a left side portion) 32, a right frame (a right side portion) 34, an upper frame (an upper side portion) 36 and a lower frame (a lower side portion) 38 corresponding to the frame shape of the back frame 10 of the seat back 3.

Figure 3A:
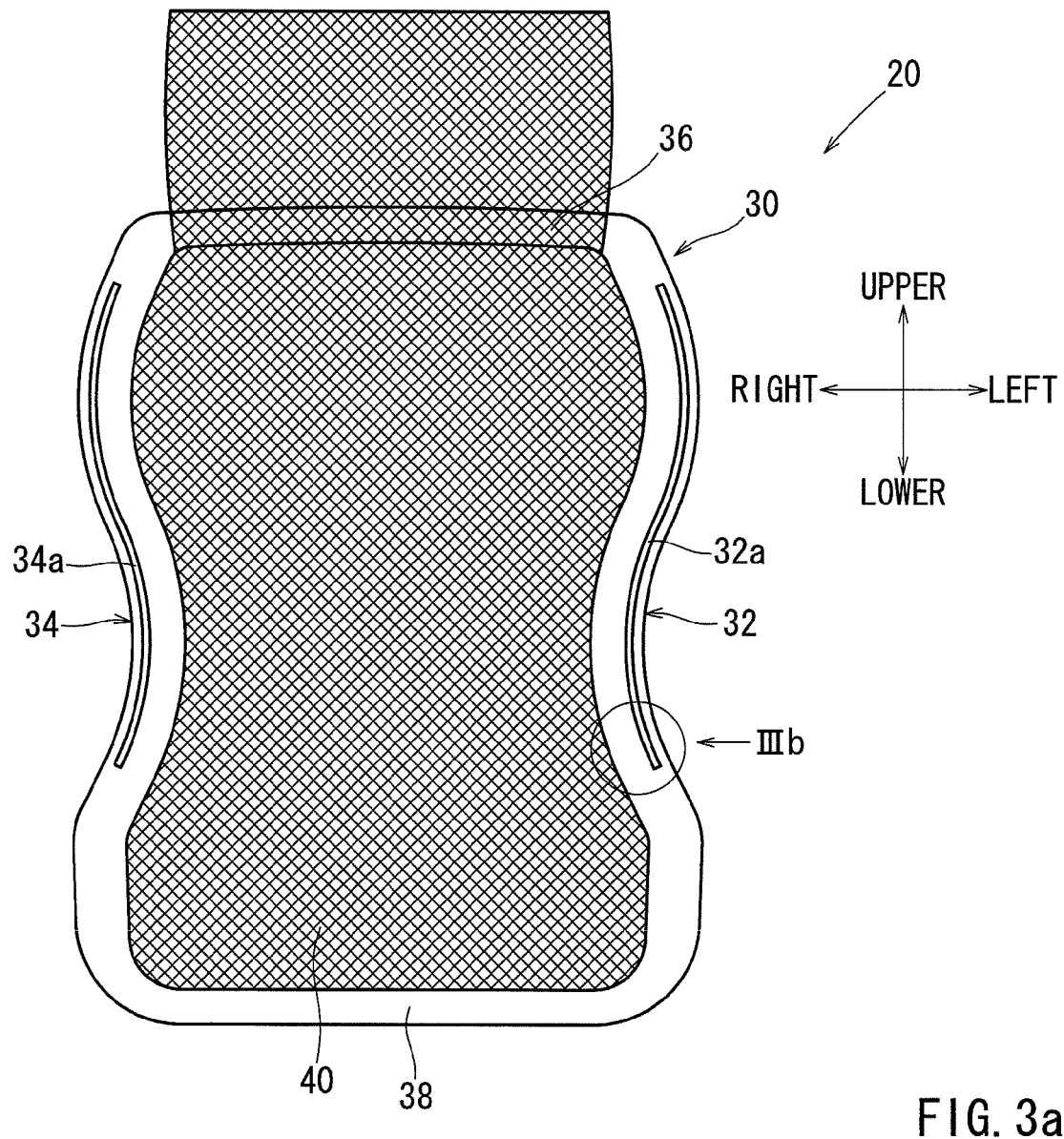
FIG. 3a is a front view of the cloth frame of FIG. 2.
Figure 3B:
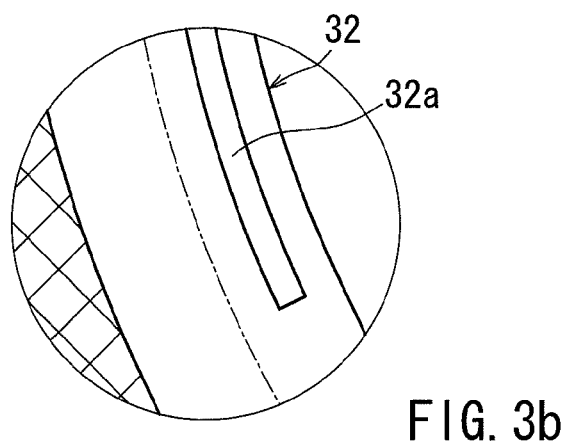

As shown in FIGS. 3a and 3b, a rib (convex portion, regulation structure) 32a is formed along a longitudinal direction on a front face of the left frame 32. The rib 32a is positioned at an outer edge of the front face of the left frame 32. In a similar way to the rib 32a, a rib (regulation structure) 34a is formed along the longitudinal direction on a front face of the right frame 34. Both ribs 32a and 34a have an approximate S-shape from a front view. The ribs 32a and 34a extend vertically and in a right-left direction. The ribs 32a and 34a are bent in a two-dimensional manner.

Figure 4:
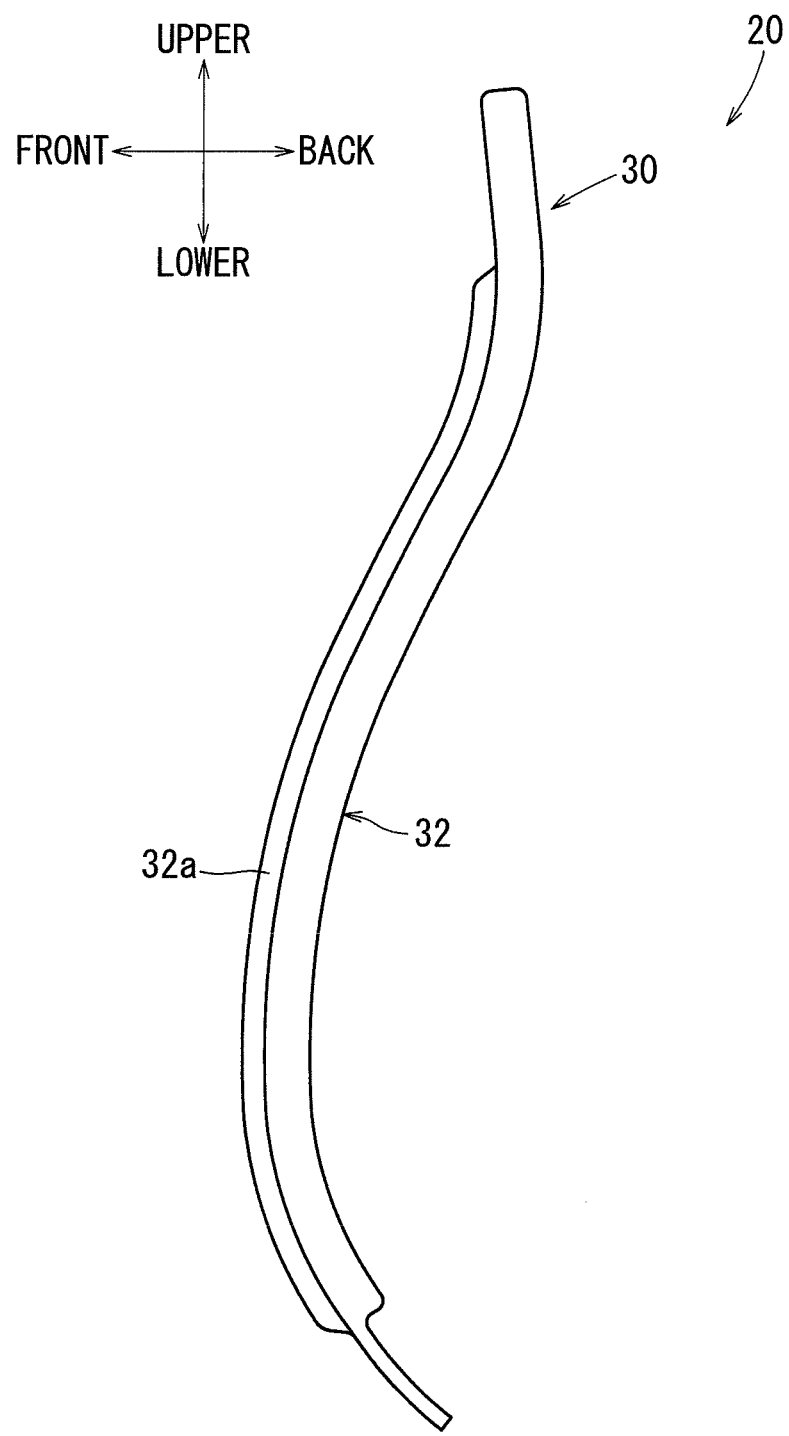
FIG. 4 is a side view of a cloth frame of FIG. 2.

As shown in FIG. 4, each of the ribs 32a and 34a has an approximate S-shape from a side view. The ribs 32a and 34a extend vertically and in a front-rear direction. The ribs 32a and 34a are bent in a three-dimensional manner. The resin frame member 30 may be attached to and detached from the front side of the back frame 10.

As shown in FIG. 3a, the net member (sheet member) 40 is a cloth member, and covers a central opening portion of the resin frame member 30. The net member 40 is a fabric formed of a wire or a string. The wire or string may be non-conductive. The net member 40 has an appropriate elasticity (tension). The net member 40 is provided integrally with the resin frame member 30 by an insert molding for molding the resin frame member 30. The frame member 30 is molded integrally with an outer peripheral edge of the net member 40. The net member 40 has an upper portion that extends upward from the resin frame member 30.

As shown in FIG. 2, coverings (pad covers) 42 and 44 are sewn on left and right edges of the net member 40. The coverings 42 and 44 are symmetrical on the left and right sides, and cover respective cushion pads 50 and 52. A hook (not shown) is sewn on each edge of the coverings 42 and 44. The hook is a J-shaped plate, and may be fastened to a rear edge of the resin frame member 30. The hook holds the coverings 42 and 44 to the resin frame member 30 so that the coverings 42 and 44 cover the cushion pads 50 and 52.

The cushion pads 50 and 52 are symmetrical on the left and right sides, as shown in FIG. 2. The cushion pads 50 and 52 are support members configured to support the sides of a passenger. Slits (concave portions, regulation structure) 50a and 52a are formed on rear faces of the cushion pads 50 and 52. The rib 32a of the left frame 32 or the rib 34a of the right frame 34 may be inserted into the slits 50a and 52a.

The ribs 32a and 34a are inserted into the slits 50a and 52a, and the coverings 42 and 44 cover the cushion pads 50 and 52. Thus, the coverings 42 and 44 may mount the cushion pads 50 and 52 on the left frame 32 and the right frame 34.

A manufacturing method of the seat back 3 will be described. First, both cushion pads 50 and 52 are mounted on the resin frame member 30. The resin frame member 30 is attached to the back frame 10. The backboard 60 is fastened to the back frame 10 by screws from the rear side. The seat back 3 is connected with the seat cushion 2, and thus, the vehicle seat 1 may be manufactured.

As described above, the cushion pads 50 and 52 are mounted on the respective front faces of the left frame 32 and the right frame 34 of the resin frame member 30 by the coverings 42 and 44. The cushion pads 50 and 52 have the slits 50a and 52a into which the rib 32a on the front face of the left frame 32 and the rib 34a on the front face of the right frame 34 are inserted. When a large force such as the weight of a person sitting in the seat is applied on the cushion pads 50 and 52, the ribs 32a and 34a prevent the cushion pads 50 and 52 from moving. Accordingly, it is possible to generally prevent the cushion pads 50 and 52 from shifting.

Each of ribs 32a and 34a has an approximate S-shape from a front view, and an approximate S-shape from a side view. Accordingly, the rib 32a of the left frame 32 and the rib 34a of the right frame 34 are hardly detached from the slits 50a and 52a of the cushion pads 50 and 52, as compared to the situation where a rib does not have an approximate S-shape but rather has a linear structure, for example. Accordingly, it is possible to further prevent the cushion pads 50 and 52 from moving, and to further prevent the cushion pads 50 and 52 from shifting even though a large force is applied thereon.

Figure 5:
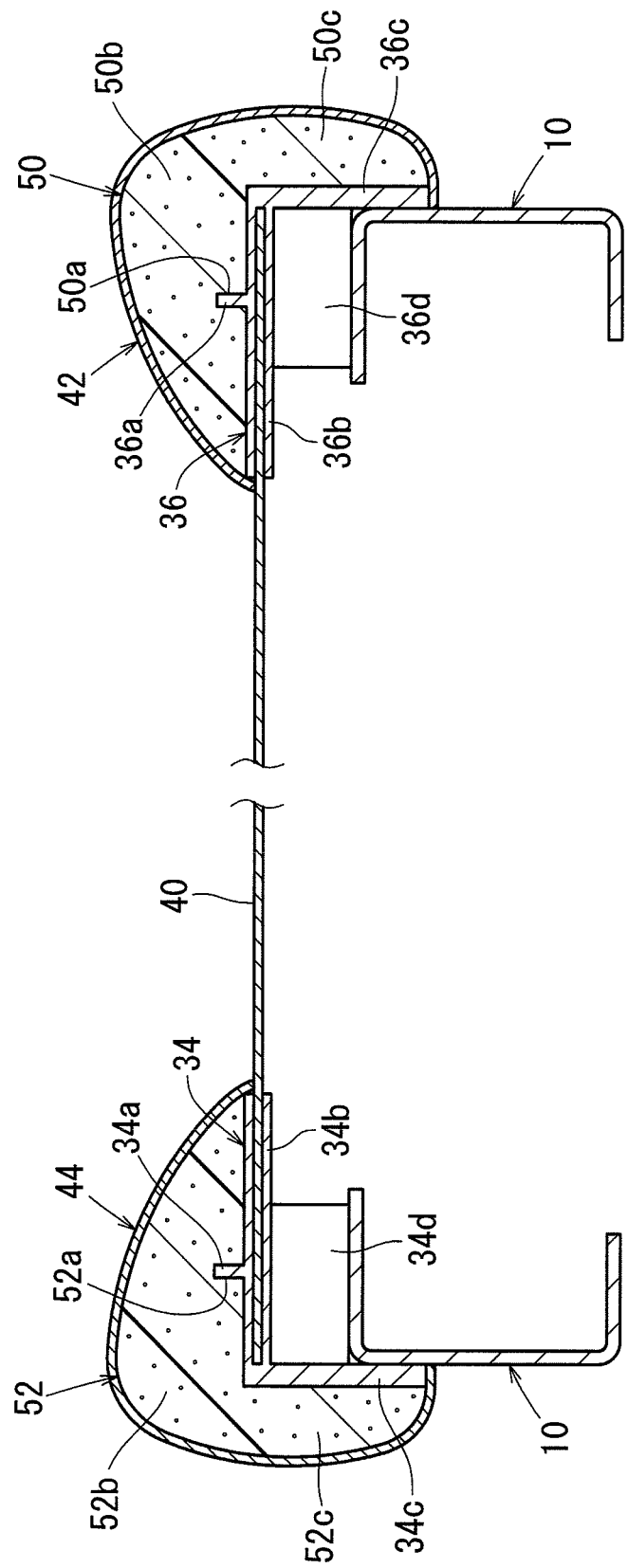
FIG. 5 is a cross-sectional view taken along line V-V in FIG. 6.

As shown in FIG. 5, the right and left frames 34 and 36, respectively, have a main plate portion 34b and 36b, a side plate portion 34c and 36c and an enforcing rib 34d and 36d. The main plate portions 34b and 36b and the net member 40 are spread out on the same plane. An end portion of the net member 40 is inserted into the main plate portions 34b and 36b. The side plate portions 34c and 36c extend backwardly from an end portion of the main plate portions 34b and 36b. The enforcing ribs 34d and 36d connect the main plate portions 34b and 36b and the side plate portions 34c and 36c so as to strengthen the frames 34 and 36.

As shown in FIG. 5, the cushion pads 50 and 52, respectively, have a main portion 50b and 52b and a side portion 50c and 52c. The main portions 50b and 52b are located on the front surface of the main plate portions 34b and 36b. The side portions 50c and 52c are located on the outer surface of the side plate portions 34c and 36c. The coverings 42 and 44, respectively, cover the main portions 50b and 52b and the side portions 50c and 52c.

Figure 6:
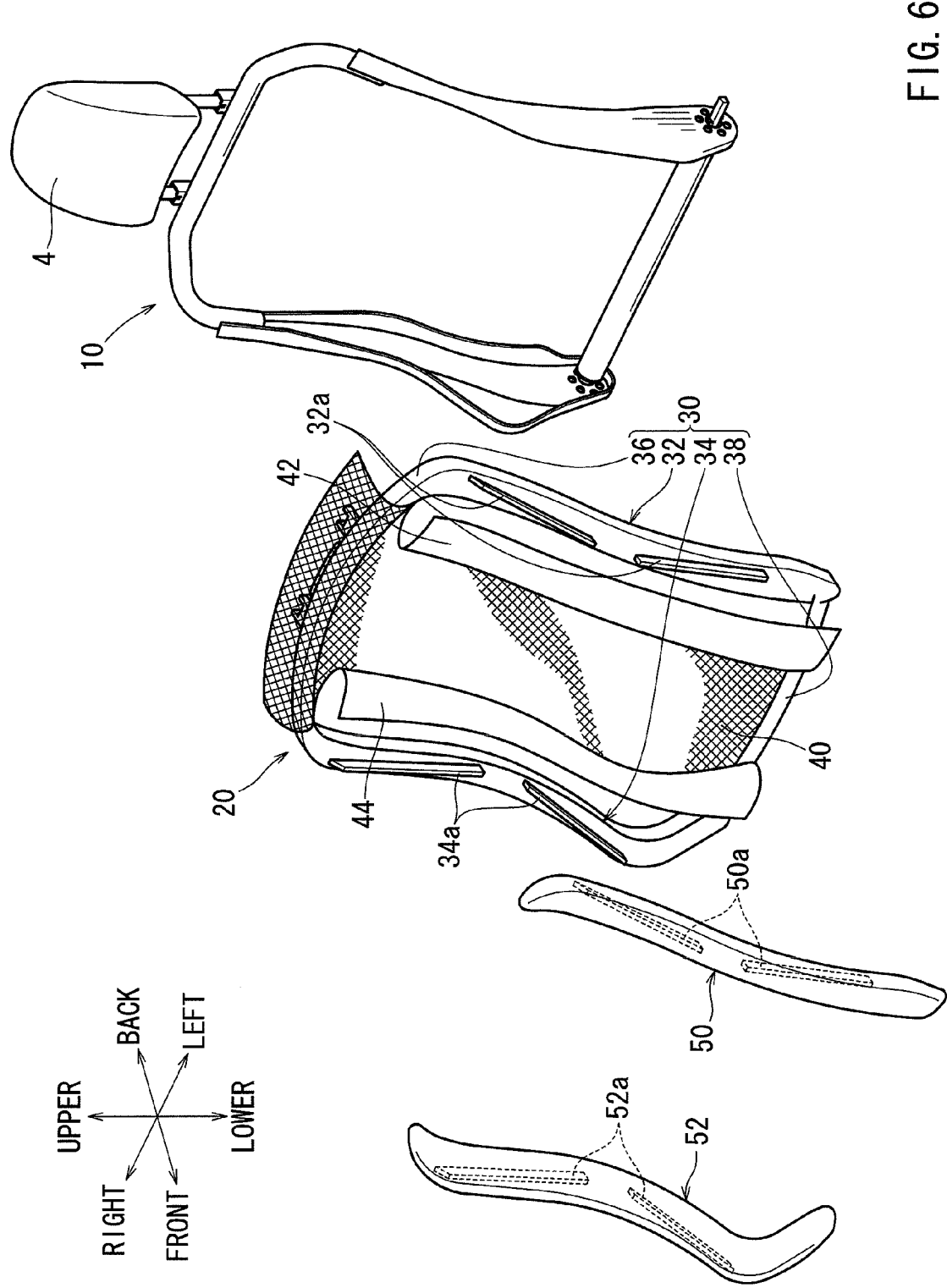
FIG. 6 is an expanded perspective view of a seat back of another aspect of an embodiment of the invention for showing a back frame, a cloth frame and a cushion pad.

The vehicle seat 1 may have a structure shown in FIG. 6, instead of the structure shown in FIG. 2. The structure in FIG. 6 is able to further prevent the cushion pads 50 and 52 from shifting compared with the structure in FIG. 2. As shown in FIG. 6, the rib 32a of the left frame 32 and the rib 34a of the right frame 34 have divided upper and lower parts. Each upper part of the ribs 32a and 34a is set at an angle. Each upper part of the ribs 32a and 34a is positioned on the outside of the seat as it goes upward and is positioned toward a central side of the seat as it goes downward. Each lower part of the ribs 32a and 34a is set at an angle. Each lower part of the ribs 32a and 34a is positioned on the outside of the seat as it goes downward and is positioned toward the center of the seat as it goes upward.

The slit 50a of the left cushion pad 50 has divided upper and lower parts, and has an inclination angle corresponding to the rib 32a. The slit 52a of the right cushion pad 52 has divided upper and lower parts, and has an inclination angle corresponding to the rib 34a.

Figure 7A:
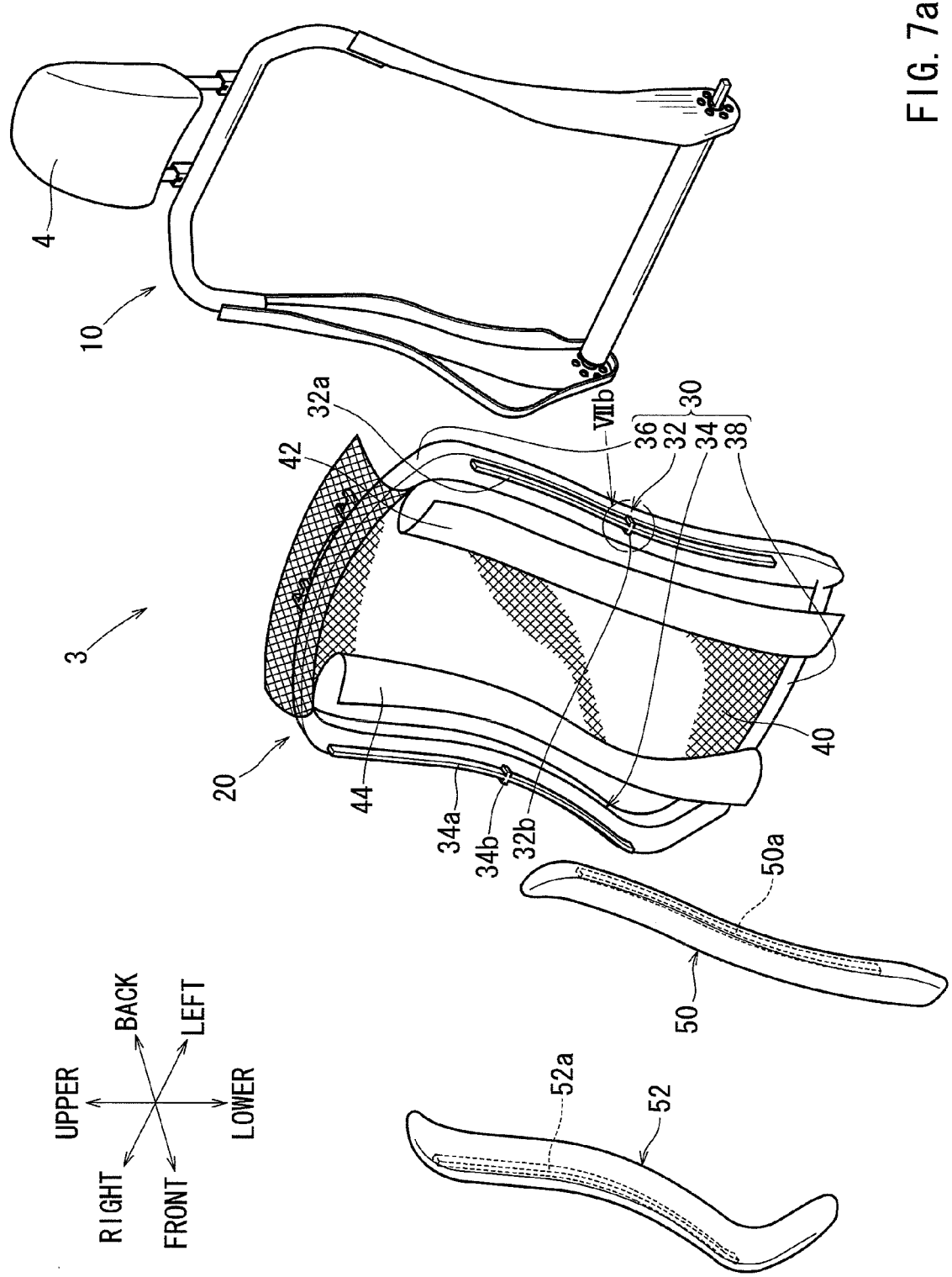
FIG. 7a is an expanded perspective view of a seat back of another aspect of an embodiment of the invention for showing a back frame, a cloth frame and a cushion pad.
Figure 7B:
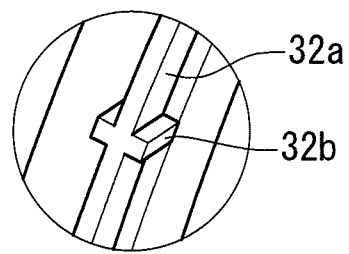

The vehicle seat 1 may have a structure shown in FIGS. 7a and 7b, instead of the structure shown in FIG. 2. In comparison to the structure in FIG. 2, the structure of FIGS. 7a and 7b is able to further prevent the cushion pads 50 and 52 from shifting. As shown in FIGS. 7a and 7b, the rib 32a of the left frame 32 has a protrusion portion 32b. The rib 34a of the right frame 34 has a protrusion portion 34b. The protrusion portions 32a and 34b are positioned at an approximately central portion of the ribs 32a and 34a in the longitudinal direction, and protrude in the left and right directions. The protrusion portions 32b and 34b are able to further restrict the cushion pads 50 and 52 from shifting. Accordingly, it is possible to more securely prevent the cushion pads 50 and 52 from shifting.

Figure 8:
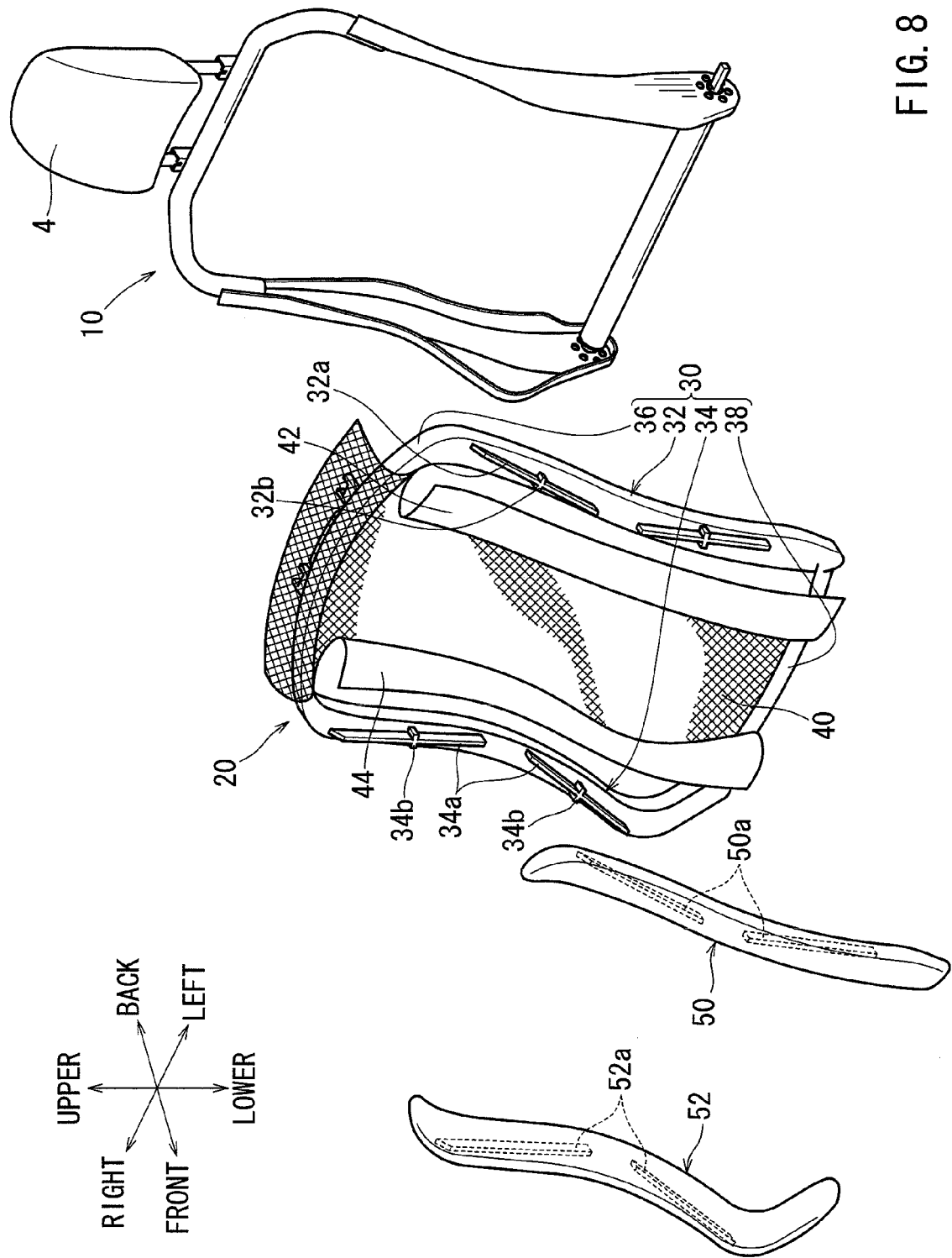
FIG. 8 is an expanded perspective view of a seat back of another aspect of an embodiment of the invention for showing a back frame, a cloth frame and a cushion pad.

The vehicle seat 1 may have a structure shown in FIG. 8 instead of the structure shown in FIG. 2. The structure shown in FIG. 8 includes the structure in FIG. 6 and the structures in FIGS. 7a and 7b. Accordingly, the structure shown in FIG. 8 is able to achieve the effects of the structure in FIG. 6 and the effects of the structures in FIGS. 7a and 7b.

Figure 9A:
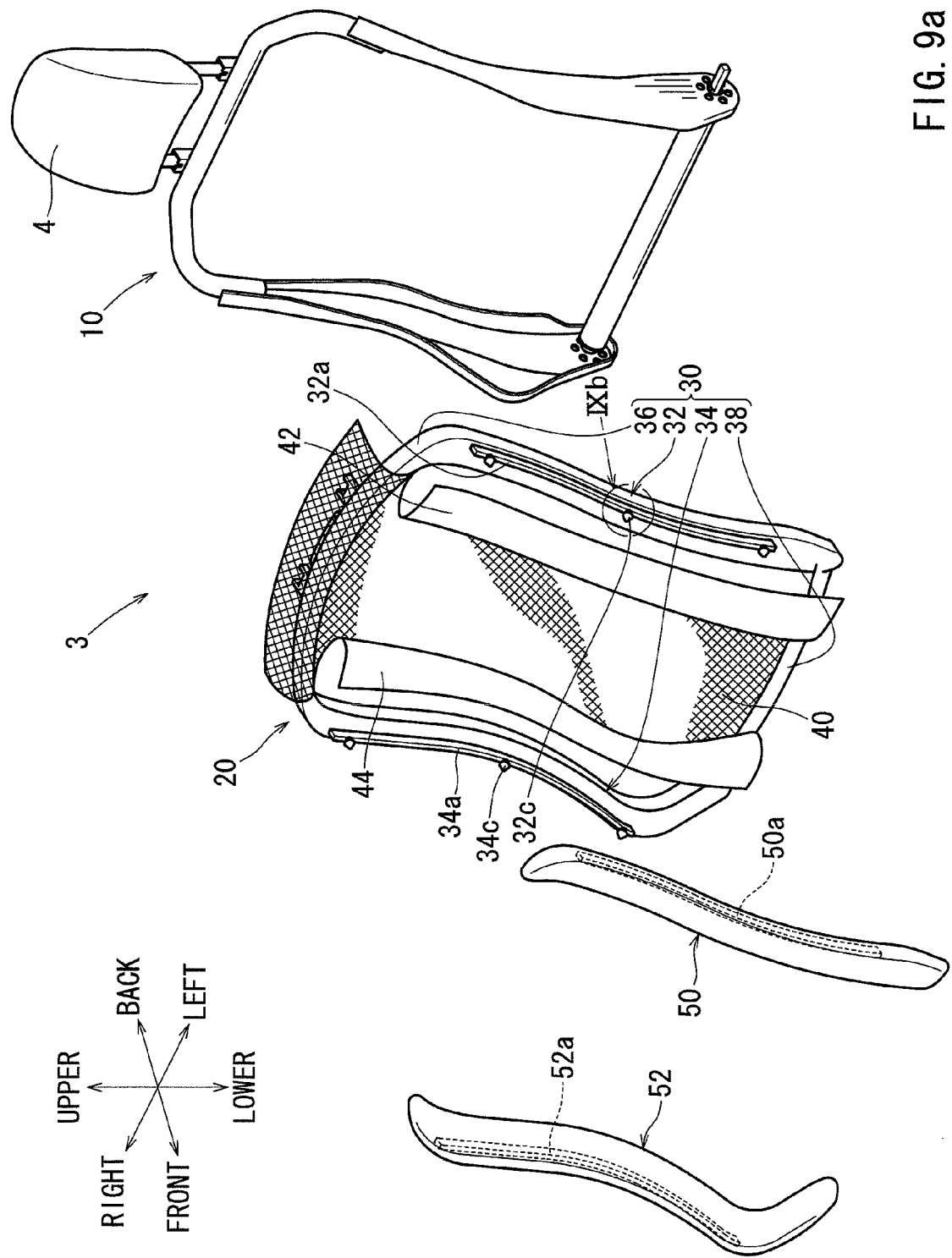
FIG. 9a is an expanded perspective view of a seat back of another aspect of an embodiment of the invention for showing a back frame, a cloth frame and a cushion pad.
Figure 9B:
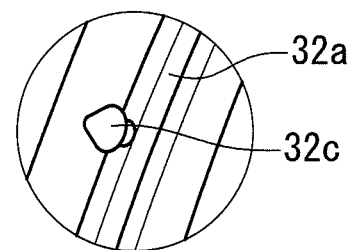

The vehicle seat 1 may have a structure shown in FIGS. 9a and 9b instead of the structure shown in FIG. 2. In comparison to the structure in FIG. 2, the structure shown in FIGS. 9a and 9b is able to further restrict the cushion pads 50 and 52 from shifting. As shown in FIGS. 9a and 9b, the rib 32a on the front face of the left frame 32 has a plurality of, for example, three, protrusion portions 32c. The rib 34a on the front face of the right frame 34 has a plurality of, for example, three, protrusion portions 34c. The protrusion portions 32c and 34c are formed at appropriate positions of the ribs 32a and 34a, in the longitudinal direction. The protrusion portions 32c and 34c protrude forward and are tapered. The protrusion portions 32c and 34c are inserted into the slits 50a and 52a, thereby making it possible to securely restrict the cushion pads 50 and 52 from shifting.

Figure 10A:
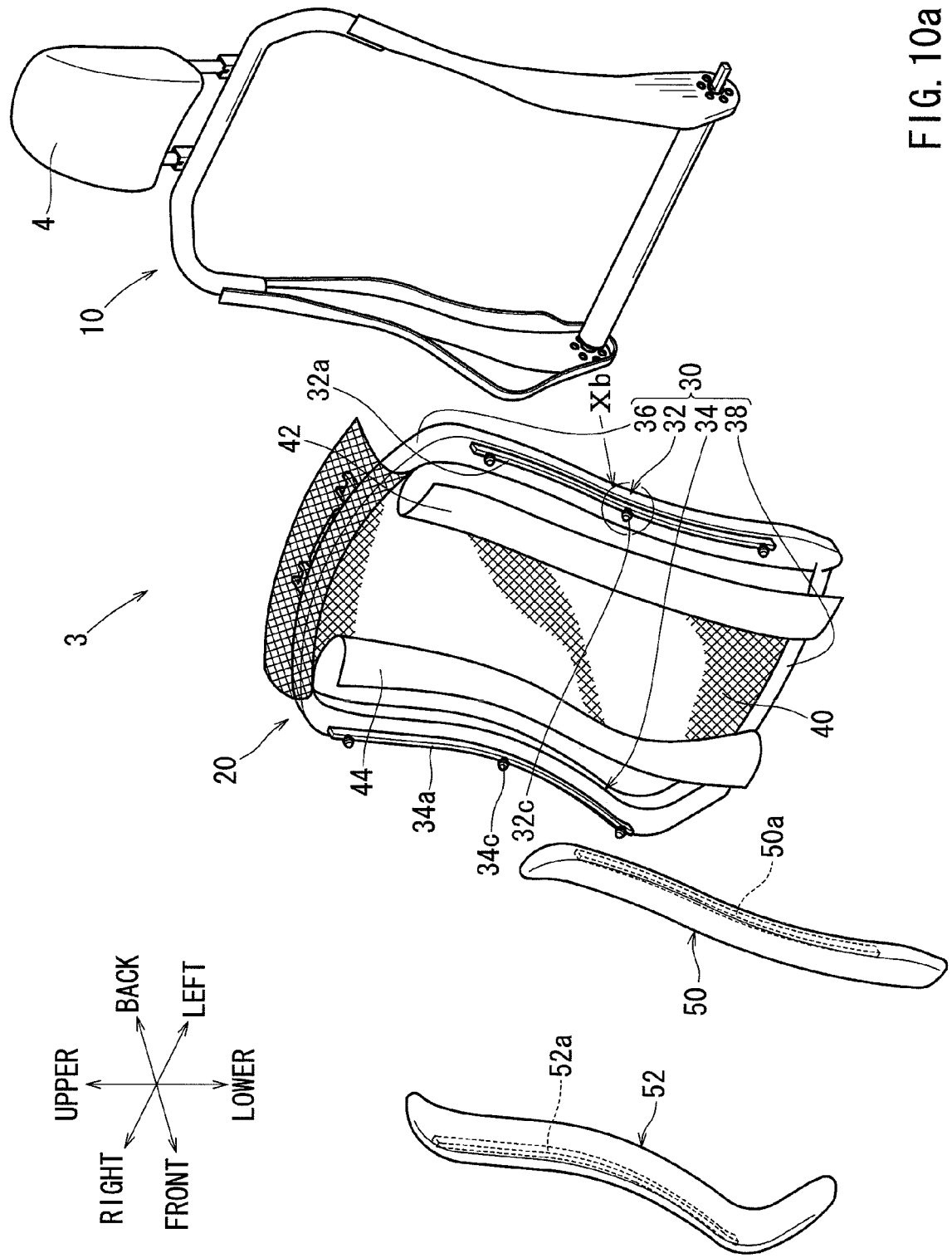
FIG. 10a is an expanded perspective view of a seat back of another aspect of an embodiment of the invention for showing a back frame, a cloth frame and a cushion pad.
Figure 10B:
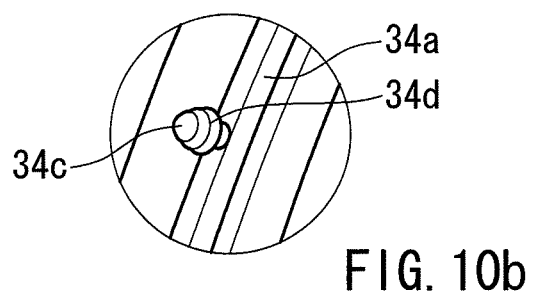

The vehicle seat 1 may have a structure shown in FIGS. 10a and 10b instead of the structure shown in FIG. 2. In comparison to the structure in FIGS. 9a and 9b, the structure shown in FIGS. 10a and 10b is able to further prevent the cushion pads 50 and 52 from shifting. As shown in FIGS. 9a and 9b, the protrusion portions 32c and 34c have a tapered surface. The tapered surface has a plurality of concentric steps 32d and 34d. The steps 32d and 34d may be inserted into the slits 50a and 52a, respectively, thereby making it possible to securely prevent the cushion pads 50 and 52 from shifting.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The cushion pads 50 and 52 may be independently provided, as shown in FIG. 2. Instead, the lower end portions of the cushion pads 50 and 52 may be coupled, and the cushion pads 50 and 52 may be integrally provided. The cushion pads 50 and 52 may be formed in an approximate U-shape.

The seat back 3 may comprise a pair of cushion pads 50 and 52 as described above. Alternately, the seat back 3 may comprise one or more cushion pads 50 and/or 52.

What is claimed is:

1. A vehicle seat comprising:
   a back frame having a generally rectangular shape;
   a frame member having a shape corresponding to a part of the back frame and being separate and attached to the back frame;
   a sheet member attached to the frame member in a tensioned state;
   a cushion pad mounted on a front surface of the frame member; and
   a regulation structure provided on the frame member and the cushion pad, and the regulation structure configured to prevent the cushion pad from shifting along the front surface of the frame member, the regulation structure comprising:
      at least one rib extending along the frame member and provided on the frame member; and
      at least one slit extending along the cushion pad and provided in the cushion pad, wherein
      the at least one rib is inserted into the at least one slit,
      the at least one rib comprises a bent portion bending in a front-back direction and a seat width direction, and
      the at least one rib has an S-shape in both the front-back direction and the seat width direction.

2. The vehicle seat of claim 1, wherein the frame member is made of resin and is molded integrally with an outer peripheral edge of the sheet member.

3. The vehicle seat of claim 1, wherein
   the cushion pad comprises a left cushion pad and a right cushion pad, wherein the frame member has left and right side portions extending vertically, and wherein
   the left cushion pad and the right cushion pad, respectively, extend along the left and right side portions of the frame member.

4. The vehicle seat of claim 1, further comprising a pad cover attached on the frame member so that the pad cover covers the cushion pad.

5. The vehicle seat of claim 1, wherein the at least one rib has a plurality of protrusion portions that are arranged in a longitudinal direction of the frame member and protrude toward the at least one slit.

6. The vehicle seat of claim 5, wherein each of the plurality of protrusions has a tapered surface including a plurality of concentric steps that engage the at least one slit.

7. A vehicle seat comprising:
   a back frame having a generally rectangular shape;
   a frame member having a shape corresponding to a part of the back frame and being separate and attached to the back frame;
   a sheet member attached to the frame member in a tensioned state;
   a cushion pad mounted on a front surface of the frame member; and
   a regulation structure provided on the frame member and the cushion pad, and the regulation structure configured to prevent the cushion pad from shifting along the front surface of the frame member, the regulation structure comprising:
      at least one rib extending along the frame member and provided on the frame member; and
      at least one slit extending along the cushion pad and provided in the cushion pad, wherein
      the at least one rib is inserted into the at least one slit,
      the at least one rib has an upper part spaced from a lower part
      the upper part is angled downwardly toward a central axis of the width of the seat, and the lower part is angled upwardly toward the central axis of the width of the seat, and
      the at least one slit has an upper part spaced from a lower part and the upper part and the lower part have an inclination angle corresponding to the upper part and the lower part of the at least one rib.

8. The vehicle seat of claim 7, wherein the frame member is made of resin and is molded integrally with an outer peripheral edge of the sheet member.

9. The vehicle seat of claim 7, wherein
the cushion pad comprises a left cushion pad and a right cushion pad, wherein the frame member has left and right side portions extending vertically, and
the left cushion pad and the right cushion pad, respectively, extend along the left and right side portions of the frame member.

10. The vehicle seat of claim 7, further comprising a pad cover attached on the frame member so that the pad cover covers the cushion pad.

11. A vehicle seat comprising:
a back frame having a generally rectangular shape;
a frame member having a shape corresponding to a part of the back frame and being separate and attached to the back frame;
a sheet member attached to the frame member in a tensioned state;
a cushion pad mounted on a front surface of the frame member; and
a regulation structure provided on the frame member and the cushion pad, and the regulation structure configured to prevent the cushion pad from shifting along the front surface of the frame member, the regulation structure comprising:
at least one rib extending along the frame member and provided on the frame member; and
at least one slit extending along the cushion pad and provided in the cushion pad, wherein
the at least one rib is inserted into the at least one slit,
the at least one rib comprises a bent portion bending in a front-back direction and a seat width direction, and
the at least one rib has a plurality of protrusion portions that are arranged in a longitudinal direction of the frame member and protrude toward the at least one slit.

12. The vehicle seat of claim 11, wherein the frame member is made of resin and is molded integrally with an outer peripheral edge of the sheet member.

13. The vehicle seat of claim 11, wherein
the cushion pad comprises a left cushion pad and a right cushion pad, wherein the frame member has left and right side portions extending vertically, and
the left cushion pad and the right cushion pad, respectively, extend along the left and right side portions of the frame member.

14. The vehicle seat of claim 11, further comprising a pad cover attached on the frame member so that the pad cover covers the cushion pad.

15. The vehicle seat of claim 11, wherein the at least one rib has an S-shape in both a front-back direction and a seat width direction.

16. The vehicle seat of claim 11, wherein each of the plurality of protrusions has a tapered surface including a plurality of concentric steps that engage the at least one slit.

* * * * *